Nov. 27, 1956
C. J. REYNOLDS
2,771,712
CENTRIFUGAL MOLDS AND METHOD
Filed July 15, 1953
3 Sheets-Sheet 1
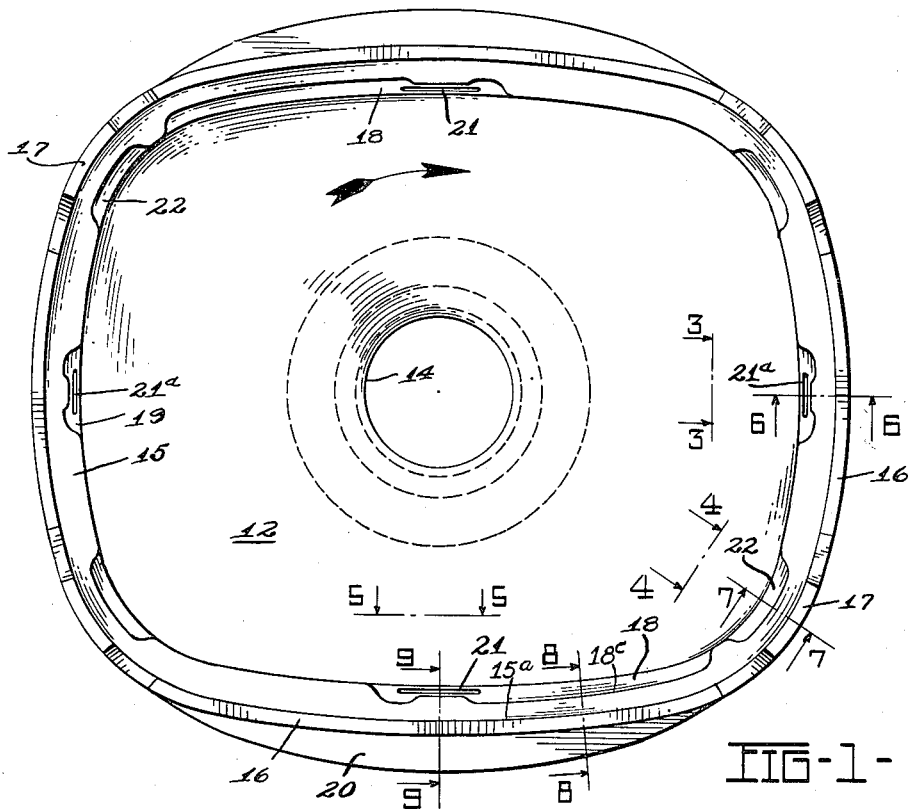
FIG-1-
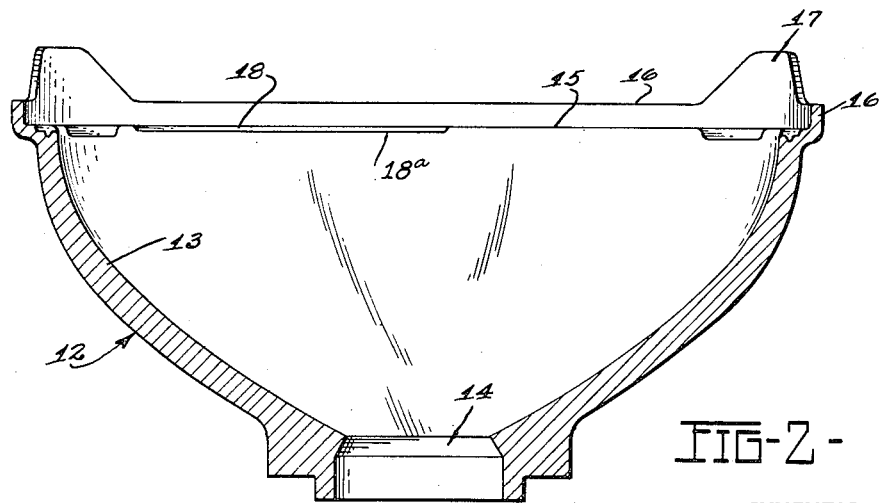
FIG-2-
INVENTOR.
CLIFFORD J. REYNOLDS
BY
*Rule and Hoge.*
ATTORNEYS

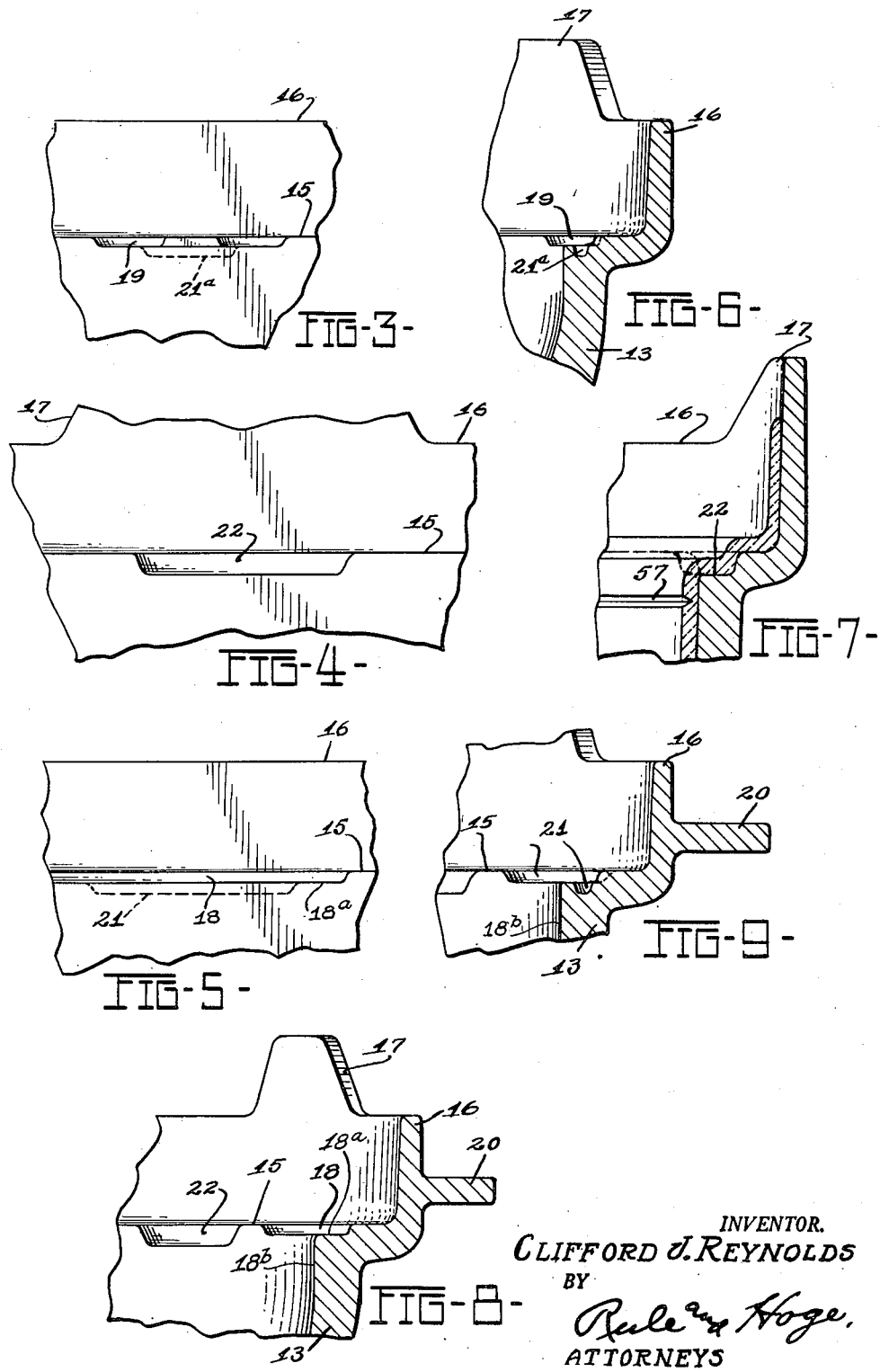

Nov. 27, 1956 C. J. REYNOLDS 2,771,712
CENTRIFUGAL MOLDS AND METHOD
Filed July 15, 1953 3 Sheets-Sheet 3

Inventor
CLIFFORD J. REYNOLDS
By Rule and Hoge
Attorneys

_United States Patent Office_

2,771,712
Patented Nov. 27, 1956

2,771,712

CENTRIFUGAL MOLDS AND METHOD

Clifford J. Reynolds, Sylvania, Ohio, assignor to Owens-Illinois Glass Company, a corporation of Ohio Application July 15, 1953, Serial No. 368,107

9 Claims. (Cl. 49—65)

My invention relates to molds for use in molding bowls or similar articles from molten glass or other molten or plastic material, the mold being rotatable about its vertical axis for shaping or molding the material by centrifugal force. An object of the invention is to provide a mold construction which will permit an effective control of the distribution of the glass or material being molded and overcome various difficulties met with in the use of conventional methods and molds.

The invention as herein illustrated is adapted for molding bowls or hollow bodies such as used for television picture tube bodies. In molding such a bowl the charge or gob of molten glass is placed in the mold and the latter rotated rapidly, thereby causing the glass to be spread and moved upwardly along the sides of the mold and over a peripheral ledge near the upper edge of the mold. The glass spreads outwardly over the ledge in a horizontal direction and then upwardly to form the rim of the bowl.

The invention provides grooves or recesses in the ledge of the mold which aid in obtaining the proper flow of the glass up over the top edge of the mold. Other recesses are designed and operate primarily to prevent rotational slippage of the glass and to retain the glass against the mold walls, particularly during the period of deceleration after the glass distribution has been substantially completed. The invention also provides additional grooves to lock the glass to the mold and prevent it from folding and/or wrinkling during such operation.

Other objects of the invention will appear hereinafter.

Referring to the accompanying drawings:

Fig. 1 is a plan view of a mold constructed in accordance with the principles of my invention;

Fig. 2 is a central longitudinal sectional elevation of the mold;

Figs. 3 to 9 are fragmentary views on a comparatively large scale, the views being taken at the correspondingly designated section lines on Fig. 1;

Figure 10:
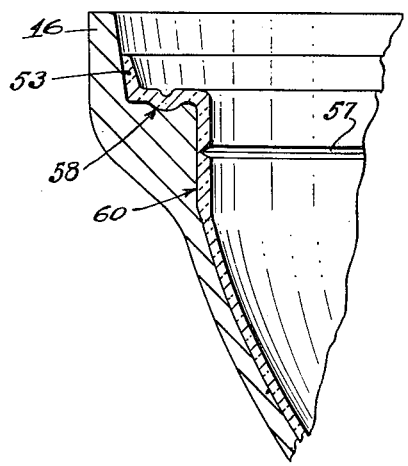
Fig. 10 is a fragmentary sectional elevation of a modified form of mold.

Referring to Figs. 1 and 2, the mold 12 is shaped and adapted for molding the bowls or bodies of television picture tubes and particularly a bowl having an approximately rectangular rim. The mold is formed with a bottom opening 14 to receive the usual knock-out valve. The side walls 13 are curved outwardly and upwardly, the upper portions being substantially vertical and terminating at a substantially horizontal peripheral ledge or top surface 15. At the outer edge of the ledge 15 is a vertical flange 16 forming the perimeter of the mold. At the corners of the mold the flange 16 has portions extended upwardly in the form of wings 17. The mold is also provided along its longer sides with crescent shaped flange portions 20 extending horizontally outwardly from the base of the flange 16.

The mold is rotated, as hereinafter described, in a clockwise direction. Recesses 18, as shown in Figs. 1 and 2, are formed in the ledge 15 and each extends approximately one-half the length of the longer side of the mold. These recesses are open along their inner edges; that is, the floors 18ª of the recesses extend to the inner wall surfaces 18ᵇ of the mold, while the outer edges 18ᶜ of the recesses are spaced inwardly from the outer edges 15ª of the ledge. At the forward end of each recess 18 considered in respect to its direction of rotation, a comparatively narrow, deep locking groove 21 is formed as shown in Figs. 1 and 9. Similar locking-grooves 21ª are formed in recesses 19 in the ledge 15 at opposite ends of the mold. Recesses 22 (Figs. 1 and 7) are formed in the ledge 15 at the corner portions thereof. The longer recesses 18 are located behind or on the lag side of the locking grooves 21 as considered in reference to the direction of rotation of the mold, namely, clockwise as indicated by the arrow, Fig. 1. These recesses 18 serve particularly to facilitate the spreading or flowing of the glass up over the ledge. The corner recesses or grooves 22 operate to prevent slippage of the glass in a horizontal direction. The locking grooves 21 serve to prevent rotational slippage of the glass, and retain the glass against the mold walls, particularly during the period of deceleration of the mold rotation. In particular, during the scoring operation (presently to be described) these grooves lock the glass to the mold and prevent it from folding and/or wrinkling during such operation.

It will be observed that the recesses 18, 19, and 22 extend only part way across the ledge 15, all of said recesses extending inwardly from the inner vertical face of the mold walls, thereby facilitating the flow of the glass into said recesses and over the surface of the ledge 15. The floors of said recesses are substantially horizontal, the recesses being of uniform depth throughout their length. The corner recesses 22 as shown are substantially deeper than the longer recesses 18, the end walls of the recesses 22 serving as stops to prevent the slipping of the glass in a horizontal direction. The corner wings 17, as shown in Fig. 7, are of sufficient height to prevent overflow of the glass which tends to ride up to a comparatively high level at these corners.

Figure 11:
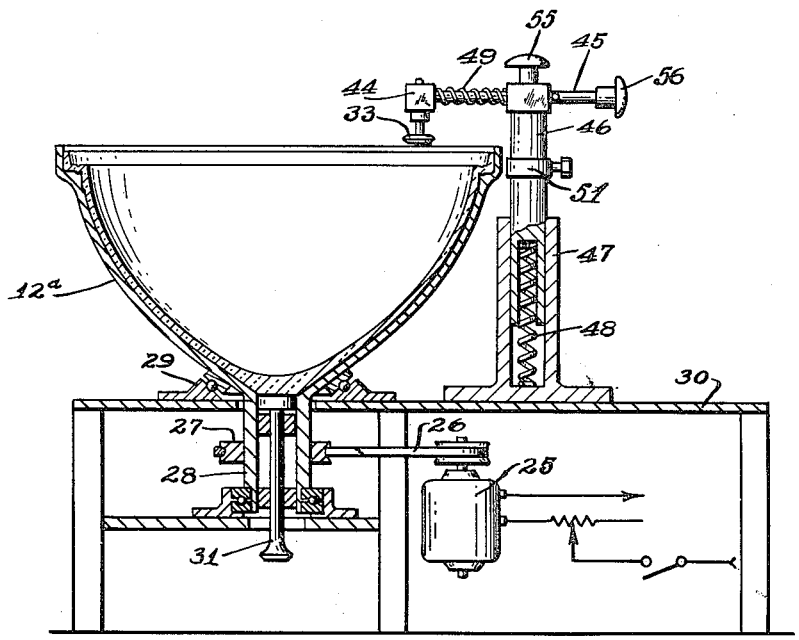
Fig. 11 is a part-sectional elevational view of a mold, means for rotating it and a scoring device.

Referring to Fig. 11 which illustrates a somewhat modified form of mold 12ª, the mold is rotated by an electric motor 25 which has driving connections with the mold comprising a belt 26 and pulley 27, the latter mounted on an extension 28 of the mold. The mold rotates on ball bearings 29 on a supporting frame 30. The molded articles can be released from the mold by a conventional ejector valve 31.

Scoring means for use in severing the waste portion or moil from the molded article comprises the scoring disk 33 mounted for rotation in a bearing head 44 attached to a horizontal rod 45, the latter being mounted for lengthwise movement in a vertical post 46. The post is slidable up and down in a bearing 47 on the frame 30. A coil spring 48 holds the post 46 in its lifted position. A coil spring 49 moves the rod 45 to its inner position as shown. A collar 51, adjustable up and down on the post 46, forms a stop to limit downward movement of the post and scoring disk.

In operation a gob or charge of molten glass is dropped into the mold and the latter rotated at a high speed, so that centrifugal force causes the glass to spread and move upwardly until it reaches and overflows the ledge 15, the rim 53 (Fig. 10) of the molded bowl being formed along the peripheral flange 16. The operator then scores the glass by pressing down on the knob 55, thereby lowering the post to bring the scoring disk to the desired level. He then pulls the knob 56 outwardly to bring the scoring disk into contact with the glass and applies sufficient pressure to form the score 57 (Fig. 10) as the mold rotates. After this scoring operation the post 46 may be rotated about its axis to swing the scoring disk out of the way, permitting the molded bowl to be loosened from the mold and lifted by the ejector valve 31 to a convenient position for being removed from the mold. The rim portion of the molded article above the score line 57 provides a convenient means for handling the molded article, this rim portion being thereafter removed in any conventional manner, as, for example, cracking it off by a differential chilling of the glass above and below the score line.

In the modified form of mold shown in Figs. 10 and 11, the floor of the ledge is formed with a groove or depression 58 extending lengthwise thereof and forming a trough in which the glass settles, thereby assisting in holding the glass against the mold walls until the molding operation has been completed and the glass set sufficiently to retain its shape. The form of mold shown in Fig. 10 comprises a wall portion with a vertical inner wall surface 60 extending below the score 57. This serves to form a vertical rim on the finished article. The form of mold shown in Figs. 10 and 11 may be provided with recesses and locking grooves such as illustrated in the other views.

Modifications may be resorted to within the spirit and scope of my invention.

I claim:

1. A hollow mold open at its upper end and having upwardly flared inner wall surfaces, the mold being formed at the upper edge of said wall surfaces with a peripheral ledge extending outwardly from said upper edge, said ledge being formed with recesses providing means to facilitate the molding of an article within the mold.

2. The apparatus defined in claim 1, the ledge being approximately rectangular, said recesses including corner recesses located at the corner portions of the mold.

3. The apparatus defined in claim 1, the mold being formed with a peripheral flange extending upwardly from said ledge and along the outer edge of the ledge.

4. The apparatus defined in claim 1, the mold being approvimately rectangular and formed with a peripheral flange extending along the outer edge of said ledge and upwardly from the ledge, said recesses including corner recesses at the corners of the ledge, said peripheral flange having wings at the corner portions thereof extending upwardly above the remaining portions of said ledge.

5. A hollow bowl-shaped mold, the rim portion of the mold being approximately rectangular with rounded corners uniting the sides and ends and with the sides of greater length than the ends, said rim portion being formed with a peripheral ledge extending outwardly throughout its periphery from the upper edge of the inner wall surfaces of the mold, said ledge being formed with recesses in said longer sides of the mold and each extending from one corner portion of the ledge to a point adjacent to the middle of the side in which it is formed, the said ledge having additional recesses in the corner portions substantially deeper than the side recesses, the floors of the side recess being formed with locking grooves beneath the floor levels and located adjacent to the ends of the side recesses nearest the middle of the sides in which they are formed.

6. The method of forming a hollow article having upwardly flared side walls, which comprises entering a charge of plastic material into an open ended mold having side walls flared toward the open end of the mold, rapidly rotating the mold about its axis and thereby spreading and molding said material over the side walls of the mold, anchoring the material to the mold adjacent to the rim thereof and thereby maintaining the material in contact with the mold during deceleration of the mold, decelerating the mold and hardening the said material.

7. The method of forming a hollow glass article having upwardly flared walls, which method comprises entering a charge of molten glass into a hollow mold having upwardly flared walls and open at its upper end, rapidly rotating the mold about its vertical axis, thereby spreading the glass and causing it to travel up the side walls of the mold, thus forming a hollow molded article, locking the upper rim portion of the molded glass to the rim of the mold, decelerating and stopping the rotation of the mold, and cooling and hardening the molded article.

8. The method defined in claim 7, said method including spreading a rim portion of the molded glass outwardly over a ledge on the mold in the form of a flange, said locking of the glass being effected by protruding portions of the glass into locking grooves formed in the mold.

9. The method defined in claim 8 including scoring the molded article at a plane below said rim portion and severing and discarding the portion of glass above the scoreline.

References Cited in the file of this patent

UNITED STATES PATENTS

| | | |
|---|---|---|
| 2,350,052 | Luertzing | May 30, 1944 |
| 2,577,423 | Ludwig et al. | Dec. 4, 1951 |
| 2,629,206 | Giffen et al. | Feb. 24, 1953 |
| 2,662,347 | Giffen | Dec. 15, 1953 |